United States Patent
Nomura et al.

(10) Patent No.: US 8,213,325 B2
(45) Date of Patent: Jul. 3, 2012

(54) PACKET ANALYSIS METHOD, PACKET ANALYSIS APPARATUS, RECORDING MEDIUM STORING PACKET ANALYSIS PROGRAM

(75) Inventors: Yuji Nomura, Kawasaki (JP); Takeshi Yasuie, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/353,068

(22) Filed: Jan. 13, 2009

(65) Prior Publication Data

US 2009/0190593 A1    Jul. 30, 2009

(30) Foreign Application Priority Data

Jan. 29, 2008    (JP) .................. 2008-017906

(51) Int. Cl.
*H04L 12/26* (2006.01)
(52) U.S. Cl. .................. 370/252; 370/394; 370/401
(58) Field of Classification Search .................. None
See application file for complete search history.

(56) References Cited

U.S. PATENT DOCUMENTS

| | | | | |
|---|---|---|---|---|
| 2002/0120727 | A1* | 8/2002 | Curley et al. .................. | 709/223 |
| 2006/0285500 | A1* | 12/2006 | Booth et al. .................. | 370/250 |
| 2007/0070916 | A1* | 3/2007 | Lehane et al. .................. | 370/252 |
| 2008/0192661 | A1* | 8/2008 | Hamamoto et al. .......... | 370/310 |
| 2009/0086736 | A1* | 4/2009 | Foong et al. .................. | 370/394 |

FOREIGN PATENT DOCUMENTS

| | | |
|---|---|---|
| JP | A 5-252179 | 9/1993 |
| JP | A 2004-80139 | 3/2004 |

OTHER PUBLICATIONS

Peter Benko; "A Passive Method for Estimating End-to-End TCP Packet Loss"; Global Telecommunications Conference, 2002; GLOBECOM '02, IEEE, Nov. 2002; pp. 2609-2613; URL http://ieeexplore.ieee.org/stamp/stamp.jsp?tp=&arnumber=1189102.
Jaiswal, Sharad, et al., "Measurement and Classification of Out-of-Sequence Packets in a Tier-1 IP Backbone", IEEE/ACM Transactions on Networking, vol. 15, No. 1, Feb. 2007, pp. 54-66.
Notification of Reason(s) for Refusal dated Mar. 13, 2012, for corresponding Japanese Patent Application No. 2008-017906 (copy and partial English translation).

* cited by examiner

*Primary Examiner* — Chirag Shah
*Assistant Examiner* — Daniel Mitchell
(74) *Attorney, Agent, or Firm* — Greer, Burns & Crain, Ltd.

(57) ABSTRACT

A packet analysis apparatus analyzes content of communication obtained as a result of monitoring or capturing a packet passing through a network. The apparatus has a unit of acquiring source or destination address information from a network layer packet header. The apparatus has a unit of acquiring from the network layer packet header an identifier for which a value that increases monotonously with each sending for each source or destination address information is set. The apparatus has a unit of searching and acquiring an identifier corresponding to address information in a current packet from a storage part holding an identifier in a previous packet corresponding to source or destination address information. The apparatus has a unit of comparing the identifier in the previous packet acquired and the identifier in the current packet and determining that reordering occurs when the identifier in the current packet is smaller.

9 Claims, 12 Drawing Sheets

FIG. 6

| IP ADDRESS | THE NUMBER OF PACKETS | THE NUMBER OF REORDERING | ORDER REVERSAL RATE |
|---|---|---|---|
| 10.20.30.45 | 1000 | 23 | 2.3% |
| 10.10.10.11 | 3000 | 0 | 0% |

FIG. 10

| TCP SESSION ID | SOURCE IP ADDRESS | NEXT Seq | LOST SENDER Seq | PREVIOUS ID |
|---|---|---|---|---|
| A | 10.20.30.45 | 680 | 676 | 335 |
| B | 10.10.10.11 | 421 | 419 | 211 |
| C | 192.168.20.30 | 102 | NONE | 100 |

| TCP SESSION ID | THE NUMBER OF PACKETS | THE NUMBER OF LOSSES | LOSS RATE | THE NUMBER OF REORDERING | REORDERING RATE |
|---|---|---|---|---|---|
| A | 30 | 0 | 0% | 2 | 6.7% |
| B | 410 | 5 | 1.2% | 1 | 0.2% |
| C | 25 | 0 | 0% | 0 | 0% |

PACKET ANALYSIS METHOD, PACKET ANALYSIS APPARATUS, RECORDING MEDIUM STORING PACKET ANALYSIS PROGRAM

CROSS-REFERENCE TO RELATED APPLICATIONS

This application is based upon and claims the benefit of priority of Japanese Patent Application No. 2008-17906, filed on Jan. 29, 2008, the entire contents of which are incorporated herein by reference.

BACKGROUND

1. Field

The embodiments discussed herein are directed to a technique for IT (Information Technology) system operation and maintenance, and more particularly to a packet analysis method for analyzing the content of communications obtained as the result of monitoring or capturing a packet passing through a network.

2. Description of the Related Art

In a protocol having a resending procedure in a layer above IP (Internet Protocol) belonging to a network layer, such as TCP (Transmission Control Protocol) belonging to a transport layer, generally, after a packet is lost due to some factor, a packet is resent to recover the loss. In other words, packet loss is identified by a monotonously increasing sequence number included in a packet, and a packet to resend is specified and resent. Thus, whether a series of data is complete can be determined by sequence numbers.

The resent packet has the same sequence number as the lost packet, so that when another packet is sent without loss immediately before resending, a portion in which the sequence number that originally increases monotonously decreases.

On the other hand, packets may be reordered on a communication path due to some factor. Also in this case, a portion in which the sequence number that originally increases monotonously decreases.

FIG. 1 is a diagram showing the outline of conventional packet monitoring, in which a packet monitoring apparatus 4 is connected to a communication path from a sending host 1 to a receiving host 2 via a branch module 3, such as a tap or a switch, and packets flowing from the sending host 1 to the receiving host 2 are monitored.

In FIG. 1, a case is shown where after a packet P1 having the sequence number (Seq) "1" is detected, there is packet dropout, and then, a packet P2 having the sequence number "3" and a packet P3 having the sequence number "2" follow. The actual sequence number starts from a first byte number in a data field (a random value) so that the sequence numbers are not continuous as "1," "2," "3" . . . , but for convenience of explanation, the sequence numbers are simplified.

In this case, the packet monitoring apparatus 4 detects that the sequence number increases from "1" to "3" and then decreases to "2." However, the behavior is exactly the same for a case where a lost packet is resent and a case where the order of packets is reordered, so that the possibility of some failure can be detected, but whether a lost packet is resent or the order of packets is reordered cannot be accurately identified. Therefore, as the result of analyzing such sequence, it is determined that either all packets are resending due to loss or all packets are reordered.

However, the mechanisms of packet loss and reordering are totally different, so that if the determination is wrong, failure cannot be restored, and much time is wasted.

On the other hand, Japanese Laid-open Patent Publication No. 2004-80139 discloses a technique for distinguishing an unarriving packet and a disappearing packet, based on the sequence number of a packet arriving at this point and the sequence number of a packet expected to arrive next, and the like. However, identifying packet loss and reordering as described above is not mentioned, and the above problem cannot be solved.

Also, Japanese Laid-open Patent Publication No. H5-252179 discloses a technique in which when a receiver communication node selects a necessary cell among cells arriving at the node from two transmission lines, based on cell sending order information, and when cell dropout occurs for an arriving cell, the cell dropout is stored, and the processing is changed by next arriving cell arrival order information. However, identifying packet loss and reordering as described above is not mentioned, and the above problem cannot be solved.

A technique disclosed in the present invention is proposed in view of the above conventional problem. The present invention provides a packet analysis method in which in analyzing the sequence of a protocol having a resending procedure in a layer above an IP layer, such as TCP, whether a packet is resent after packet loss, or reordering occurs in a network to change the arrival order can be accurately identified. It is an object of the present invention to separate the failure phenomenon of reordering and the failure phenomenon of packet loss occurring in a network.

SUMMARY

A packet analysis apparatus analyzes content of communication obtained as a result of monitoring or capturing a packet passing through a network. The apparatus has a unit of acquiring source or destination address information from a network layer packet header. The apparatus has a unit of acquiring from the network layer packet header an identifier for which a value that increases monotonously with each sending for each source or destination address information is set. The apparatus has a unit of searching and acquiring an identifier corresponding to address information in a current packet from a storage part holding an identifier in a previous packet corresponding to source or destination address information. The apparatus has a unit of comparing the identifier in the previous packet acquired and the identifier in the current packet and determining that reordering occurs when the identifier in the current packet is smaller.

BRIEF DESCRIPTION OF THE DRAWINGS

FIG. 6 is a diagram showing an example of the data structure of a monitoring result holding table;

FIG. 10 is a diagram showing an example of the data structure of a communication state holding table;

FIG. 11 is a diagram showing an example of the data structure of a monitoring result holding table.

DESCRIPTION OF THE PREFERRED EMBODIMENTS

The favorable embodiments of the present invention will be described below.

Data Structure of IP Packet

Figure 2:
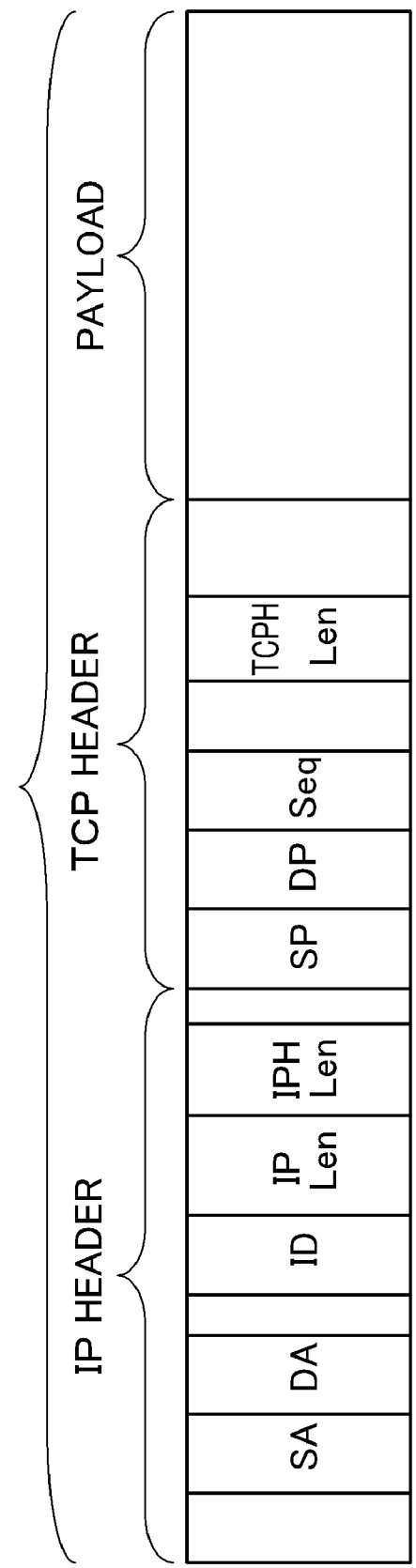
FIG. 2 is a diagram showing the data structure of an IP packet.

FIG. 2 is a diagram showing the data structure of an IP packet to be processed.

In FIG. 2, the IP packet is made up of an IP header, a TCP header, and a payload. A source address SA, a destination address DA, an identifier ID, an IP packet length IPLen, and an IP header length IPHLen are included in the IP header. The identifier ID is a 16-bit value and has the nature of being incremented each time an IP terminal sends an IP packet. Therefore, unless reordering occurs in a network from the IP terminal to a point at which packets are monitored, the identifier ID increases monotonously when communication is monitored from the same IP terminal.

A source port SP, a destination port DP, a sequence number Seq, and a TCP header length TCPHLen are included in the TCP header. For the sequence number Seq in the TCP header, there are two numbers, a number meaning the number of bytes sent from the source address SA, and a number meaning bytes sent from the destination address DA, but for simplifying explanation, the number of bytes sent from the source address SA is meant below.

In a first embodiment below, the source address SA and the identifier ID in the IP header are mainly used. In a second embodiment, further, a TCP session ID in which the source address SA and the destination address DA in the IP header, and the source port SP and the destination port DP in the TCP header are combined, the sequence number Seq in the TCP header, and a TCP data length Len are used. The TCP data length Len is obtained by $$Len = IPLen - IPHLen - TCPHLen.$$

First Embodiment

Figure 1:
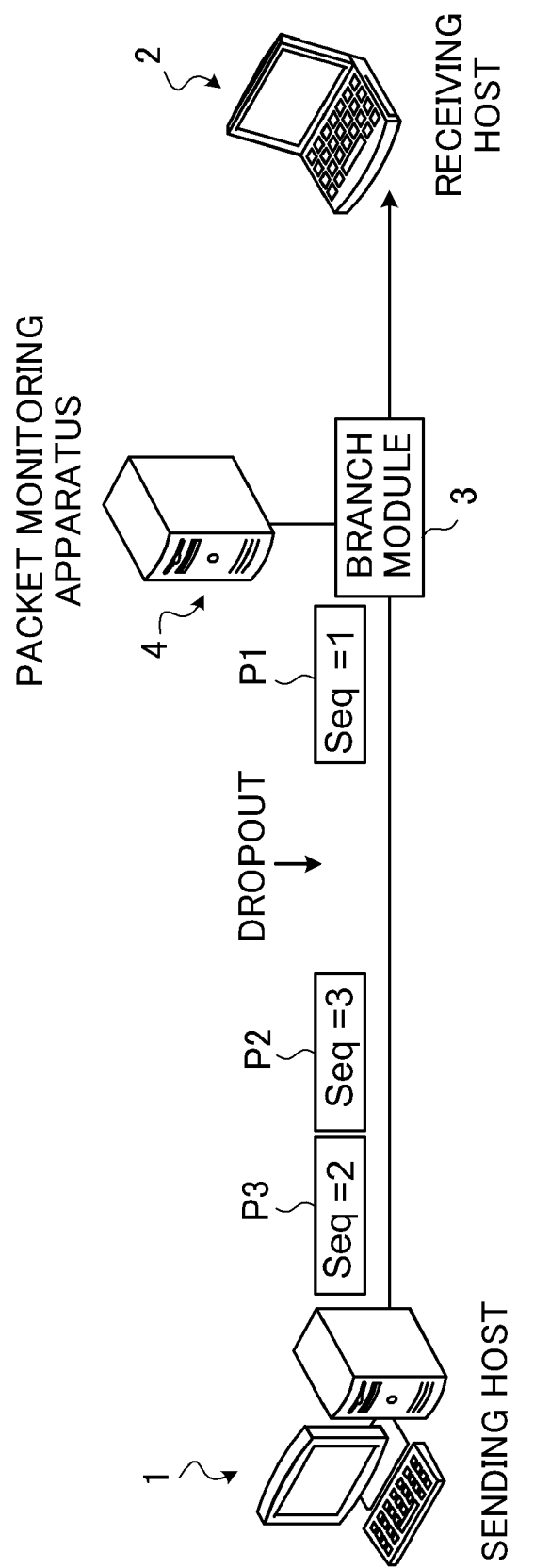
FIG. 1 is a diagram showing the outline of conventional packet monitoring.

In this first embodiment, packet reordering is identified. Packet reordering can be identified, so that by combining the conventional technique focusing on the sequence number described in FIG. 1, whether a packet is resent after packet loss, or reordering occurs in a network to change the arrival order can be accurately identified.

Figure 3:
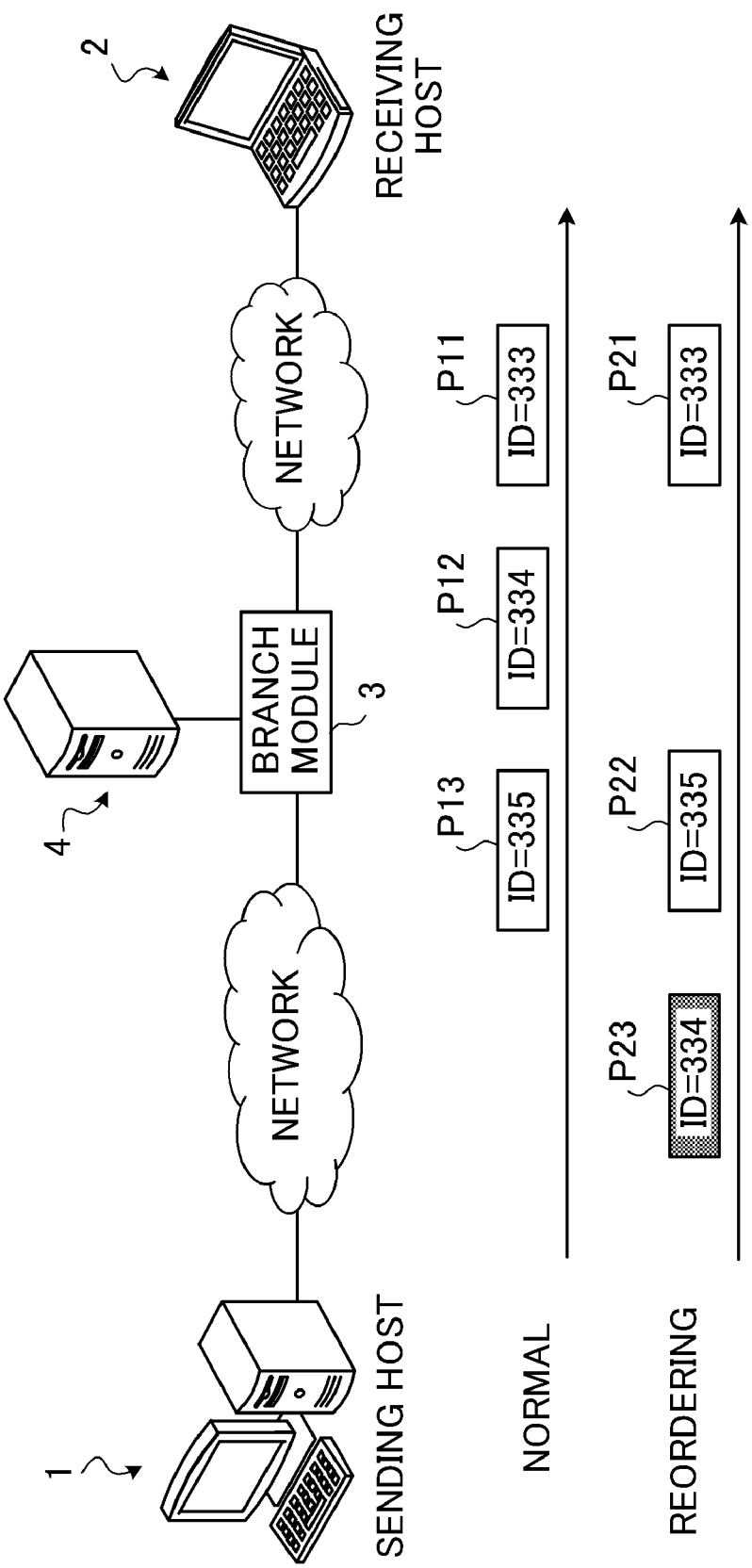
FIG. 3 is a diagram showing the outline of packet monitoring according to the first embodiment of the present invention.

FIG. 3 is a diagram showing the outline of packet monitoring according to the first embodiment of the present invention.

In FIG. 3, a packet monitoring apparatus 4 is connected to a network via a branch module 3, such as the monitoring port of a switch or a tap, on a communication path connecting a sending host 1 and a receiving host 2 and is adapted to be able to monitor packets sent from the sending host 1 to the receiving host 2.

Now, assume that packets P11, P12, and P13 in which the identifiers (ID) have the values "333," "334," and "335" are sent from the sending host 1 toward the receiving host 2 in time series. In this case, by monitoring the identifier for each packet, the packet monitoring apparatus 4 finds that there is no reordering because the identifier increases monotonously. In other words, the packet monitoring apparatus 4 can measure that the packets are correctly transferred on the network from the sending host 1 to the branch module 3, to which the packet monitoring apparatus 4 is connected, without reordering.

On the other hand, when packets P21, P22, and P23 in which the identifiers are "333," "335," and "334" arrive at the packet monitoring apparatus 4 in this order, the identifier once increases from "333" to "335" and then decreases from "335" to "334," so that the packet monitoring apparatus 4 can determine that the identifier does not increase monotonously. In other words, the packet monitoring apparatus 4 can determine that the arrival order of the packet P23 having the decreased identifier "334" and the packet P22 having "335" was changed on the network from the sending host 1 to the branch module 3. In this example, the number of the sent packets is three, and the number of the reordered packets is one, so that the reordering rate is 33.3%.

Figure 4:
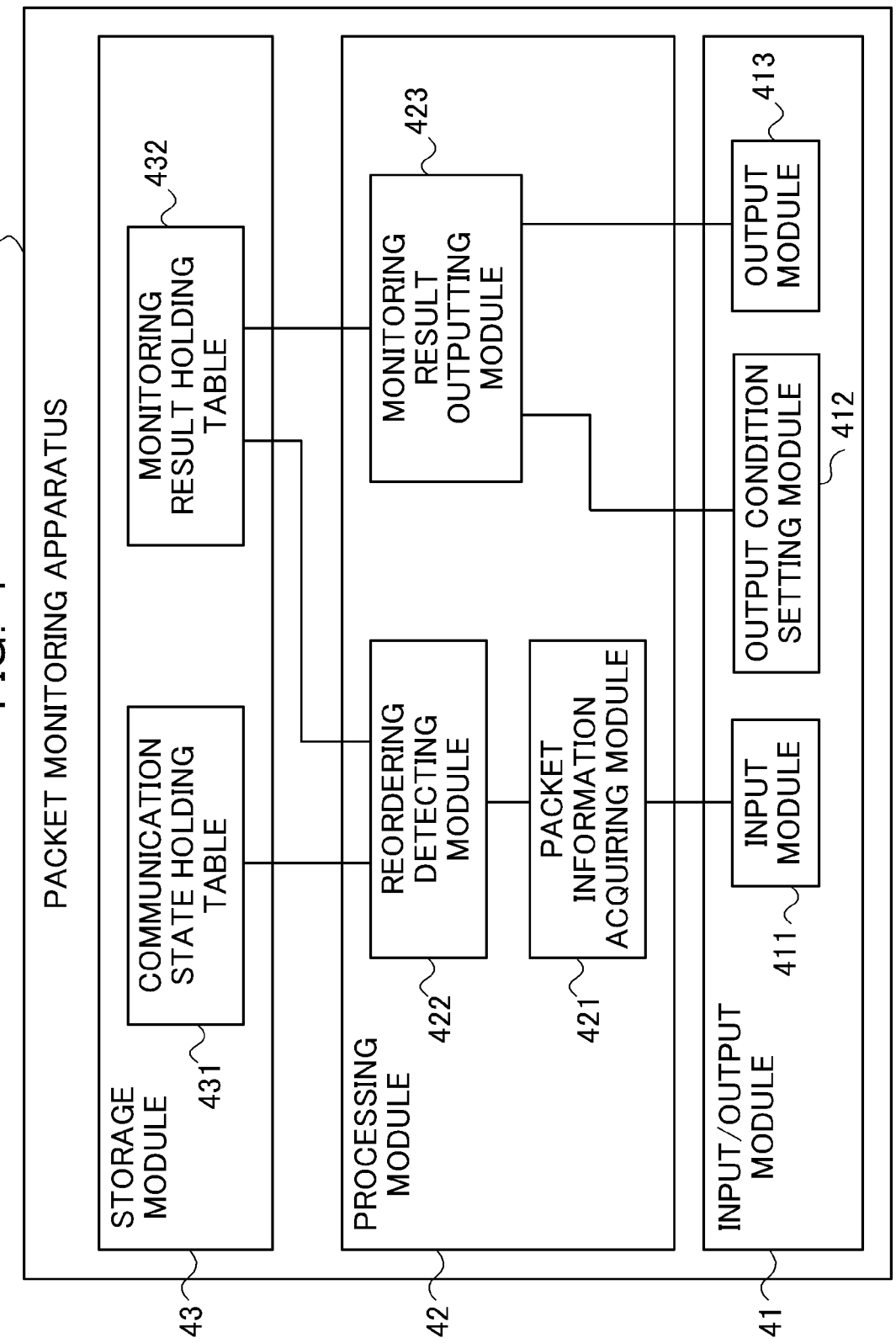
FIG. 4 is a diagram showing an example of the configuration of a packet monitoring apparatus.

FIG. 4 is a diagram showing an example of the configuration of the packet monitoring apparatus 4.

In FIG. 4, the packet monitoring apparatus 4 includes an input/output module 41 for inputting packet information and outputting a monitoring result, a processing module 42 for performing processing, such as packet identification, and a storage module 43 for holding the data of the processing process.

The input/output module 41 has an input module 411, an output condition setting module 412, and an output module 413. The processing module 42 has a packet information acquiring module 421, a reordering detecting module 422, and a monitoring result outputting module 423. The storage module 43 includes a communication state holding table 431 and a monitoring result holding table 432.

The input module 411 of the input/output module 41 has the function of monitoring packets sent and received in a network interface or inputting the information of a file in which a captured packet is stored with the information of receiving time for each packet. When the input module 411 monitors packets, the real time property or the continuity of monitoring is excellent. For example, the input module 411 even monitors a packet whose order is reordered all the time. Also, when the input module inputs a packet captured file, it is necessary to previously collect packet capture data and store it as a file, but it is possible to examine whether there is reordering or not without installing the packet monitoring apparatus 4 on-site.

The output condition setting module 412 has the function of setting output conditions (filtering conditions and the like) for outputting a monitoring result for a specific IP address, and the like.

The output module 413 has the function of outputting a monitoring result from the monitoring result outputting module 423. The output module 413 is an interface for outputting a monitoring result and may be a screen for displaying statistics information for a network manager or may be a network interface for supporting a communication protocol for sending to a network management system (NMS).

The packet information acquiring module 421 of the processing module 42 has the function of acquiring packet information from the input module 411, acquiring a source address SA and an identifier ID described in an IP header, and delivering the set to the later-stage reordering detecting module 422.

The reordering detecting module 422 has the function of acquiring a set of a source address SA and an identifier ID from the packet information acquiring module 421, then, with the source address SA as a key, searching source addresses SA stored in the communication state holding table 431, and acquiring the immediately preceding identifier ID. At this time, when the corresponding identifier ID is not present, the reordering detecting module 422 newly stores the source address SA and the identifier ID in the communication state holding table 431, and when the corresponding identifier ID is present, the reordering detecting module 422 overwrites and updates the corresponding identifier ID with a new identifier ID. Also, the reordering detecting module 422 compares the sizes of the identifier ID acquired from the packet information acquiring module 421 and the identifier ID acquired from the communication state holding table 431. The reordering detecting module 422 has the function of deciding that there is no reordering, when the identifier ID increases, deciding that there is reordering, when the identifier ID decreases, and storing the decision result in the monitoring result holding table 432. The decision result is to be notified to the network manager and an upper monitoring apparatus (not shown) and includes statistics information, for example, the total number of packets, the number of reordering, and an reordering rate (a value obtained by dividing the number of reordering by the total number of packets) for each source address SA. The detailed processing of the reordering detecting module 422 will be described later.

The monitoring result outputting module 423 has the function of acquiring part or all of information stored in the monitoring result holding table 432, according to output conditions set by the output condition setting module 412, and delivering it to the output module 413. For example, the monitoring result outputting module 423 can extract statistics information stored in the monitoring result holding table 432, based on filtering conditions for a specific source address SA or a specific group of source addresses SA or the like.

Figure 5:
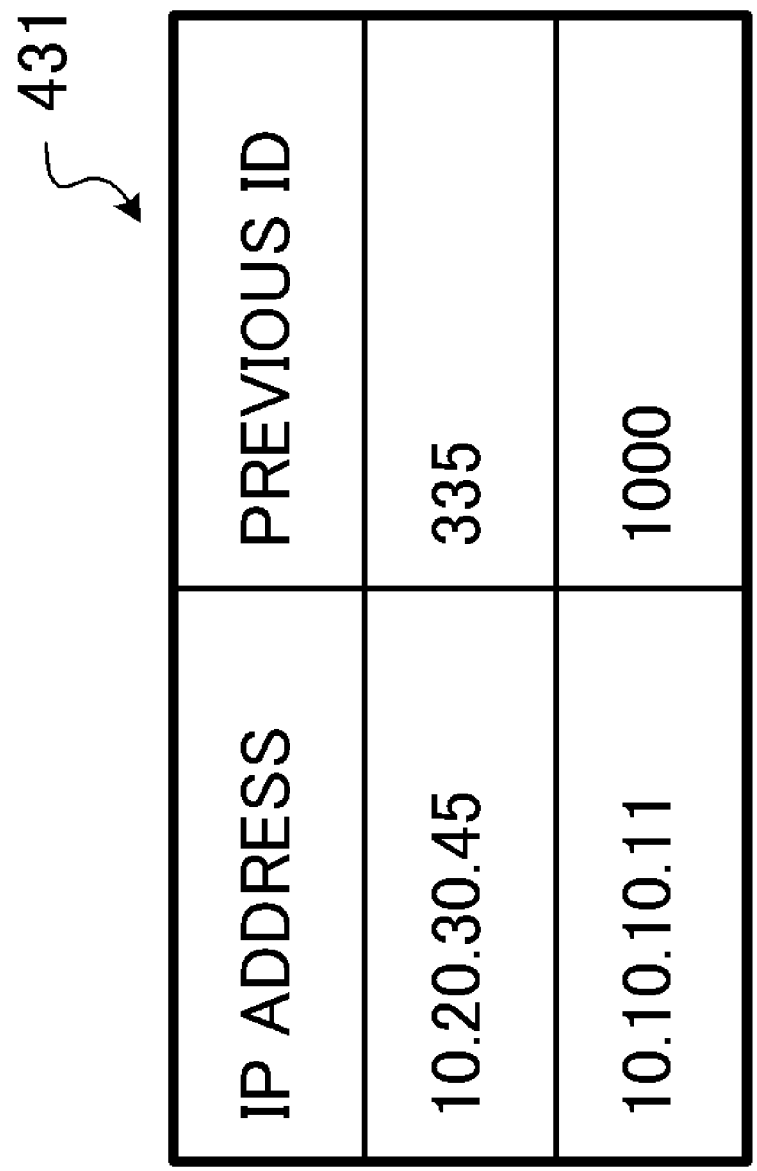
FIG. 5 is a diagram showing an example of the data structure of a communication state holding table.

FIG. 5 is a diagram showing an example of the data structure of the communication state holding table 431, which has an "IP address" field for holding a source address SA, and a "previous ID" field for holding a previous identifier ID. In this embodiment, a source address SA is held in the "IP address" field, but a destination address DA may be held.

FIG. 6 is a diagram showing an example of the data structure of the monitoring result holding table 432, which has an "IP address" field for holding a source address SA, a "the number of packets" field for holding the number of packets for which sending from a corresponding source address SA is detected, a "the number of reordering" field for holding the number of reordering detected among packets from the corresponding source address SA, and an "reordering rate" field for holding an reordering rate that is the ratio of the number of reordering to the number of packets. In this embodiment, a source address SA is held in the "IP address" field, but a destination address DA may be held.

Figure 7:
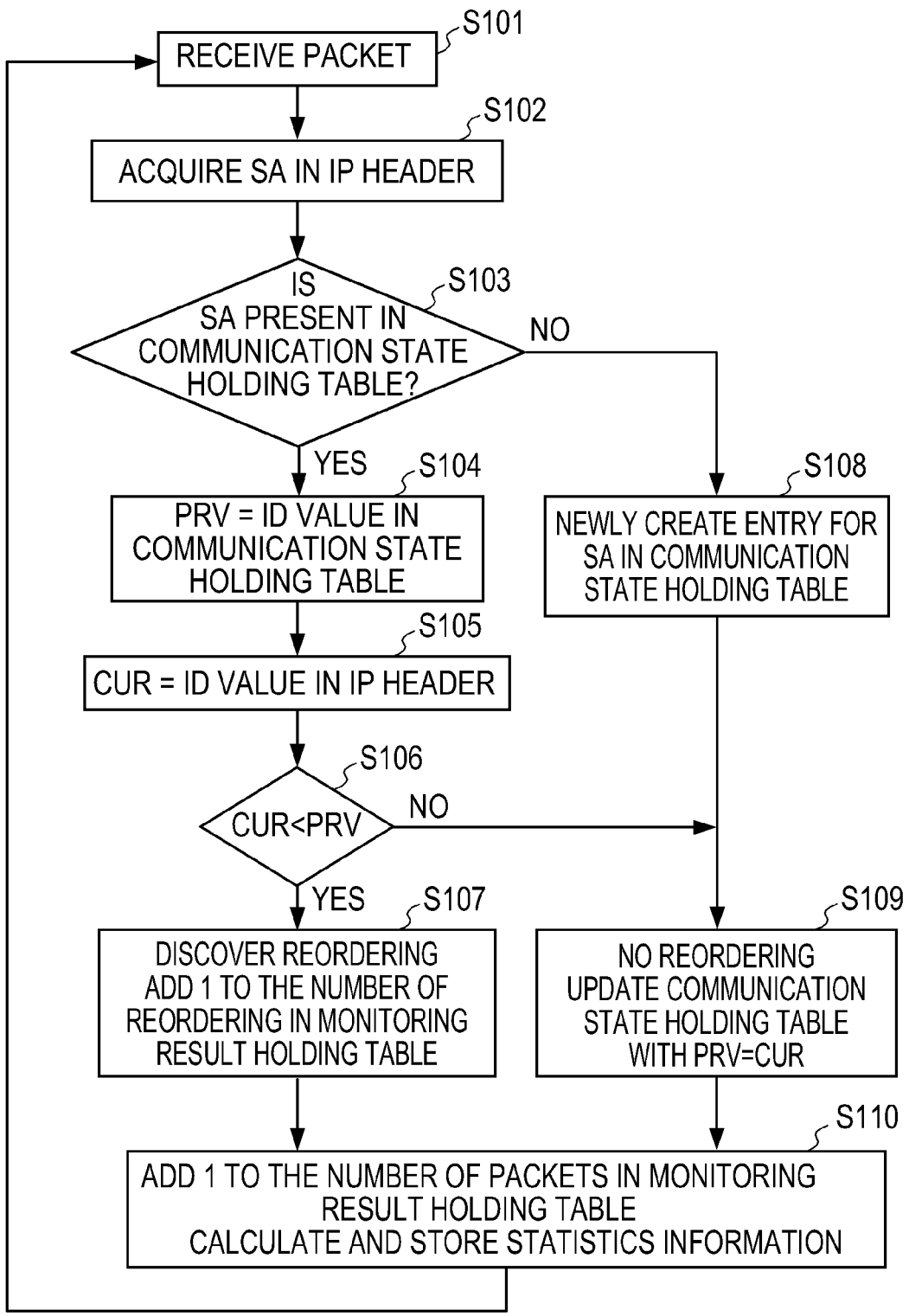
FIG. 7 is a flow chart showing an example of the processing of the first embodiment.

FIG. 7 is a flow chart showing an example of the processing of the first embodiment.

In FIG. 7, now, when data as in FIG. 5 is held in the communication state holding table 431, and when a packet having a source address SA="10.20.30.45" and an identifier ID="334" newly arrives (step S101), the source address SA="10.20.30.45" is acquired from the IP header (step S102).

Then, when the communication state holding table 431 is searched with the IP address "10.20.30.45" as a key (step S103), the corresponding entry is present, and "335" is acquired as the previous ID. This "335" is provisionally defined as PRV (step S104), and "334" acquired from the IP header is defined as CUR (step S105).

Then, by comparing CUR and PRV (step S106), it can be determined that there is reordering because the PRV "335" is larger than the CUR "334" that is the current ID, and "24" is written as a value obtained by adding 1 to the number of reordering in the monitoring result holding table 432 (step S107). Also, for the number of packets in the monitoring result holding table 432, "1001" is written as a value obtained by adding 1, and in addition, the reordering rate is also updated (step S110). Subsequently, the process returns to receiving processing for the next packet (step S101).

On the other hand, supposing that a packet having a source address SA="10.20.30.45" and an identifier ID="336" arrives (step S101), the PRV "335" is smaller than the CUR "336" (NO in step S106), so that it is determined that there is no reordering. Then, the previous ID in the communication state holding table 431 is updated to "336" (step S109), and 1 is added to the number of packets in the monitoring result holding table 432 to be "1001." In addition, the reordering rate is also updated (step S110), and the process returns to receiving processing for the next packet (step S101).

On the other hand, supposing that a packet having a source address SA="10.40.50.67" and an identifier ID="200" is received (step S101), and an entry having the same source address SA is not present in the communication state holding table 431 (NO in step S103) so that an entry having the source address SA is newly created (step S108). Then, the currently received identifier ID is substituted for the previous ID (step S109), the reordering rate is updated (step S110), 1 is added to the number of packets to be "1001." In addition, the reordering rate is also updated (step S110), and the process returns to receiving processing for the next packet (step S101).

In this example, for convenience of explanation, the sizes of the previous ID and the current identifier ID are simply compared, but in practice, an identifier ID is a value that circulates with 16 bits, so that sizes considering the circulation may be compared. This can be achieved by also simultaneously considering a value obtained by adding the hexadecimal number "FFFF" to the current identifier ID to be carried. Also, an identifier ID is a 16-bit value, and depending on host implementation, it is also possible that endian, that is, the arrangement of high-order 8 bits and low-order 8 bits, is host order, rather than network order. In the case, the sizes should be compared with high order and low order inverted. This can be achieved by, depending on whether "1" is added to the identifier ID or "256" is added to the identifier ID, setting an endian flag in the communication state holding table 431 and inverting high order and low order based on the flag.

Also, a certain IP address may be a source address SA, communication passing through the packet monitoring apparatus 4 may be intermittent, and depending on the time period, communication not passing through the packet monitoring apparatus 4 may be executed. In this case, it is possible that identifiers ID for the source address SA received in the packet monitoring apparatus 4 are not continuous and are intermittent. This is a factor of wrong decision on the sizes of the identifiers ID. Therefore, for example, the communication state holding table 431 has a field of previous communication time, and when fixed communication time or more elapses, size comparison is not performed, and a new ID value is simply substituted. In this way, a possibility that size comparison is inaccurate due to the elapse of time may be eliminated.

Second Embodiment

In this second embodiment, packet resending due to loss and reordering are identified.

Figure 8:
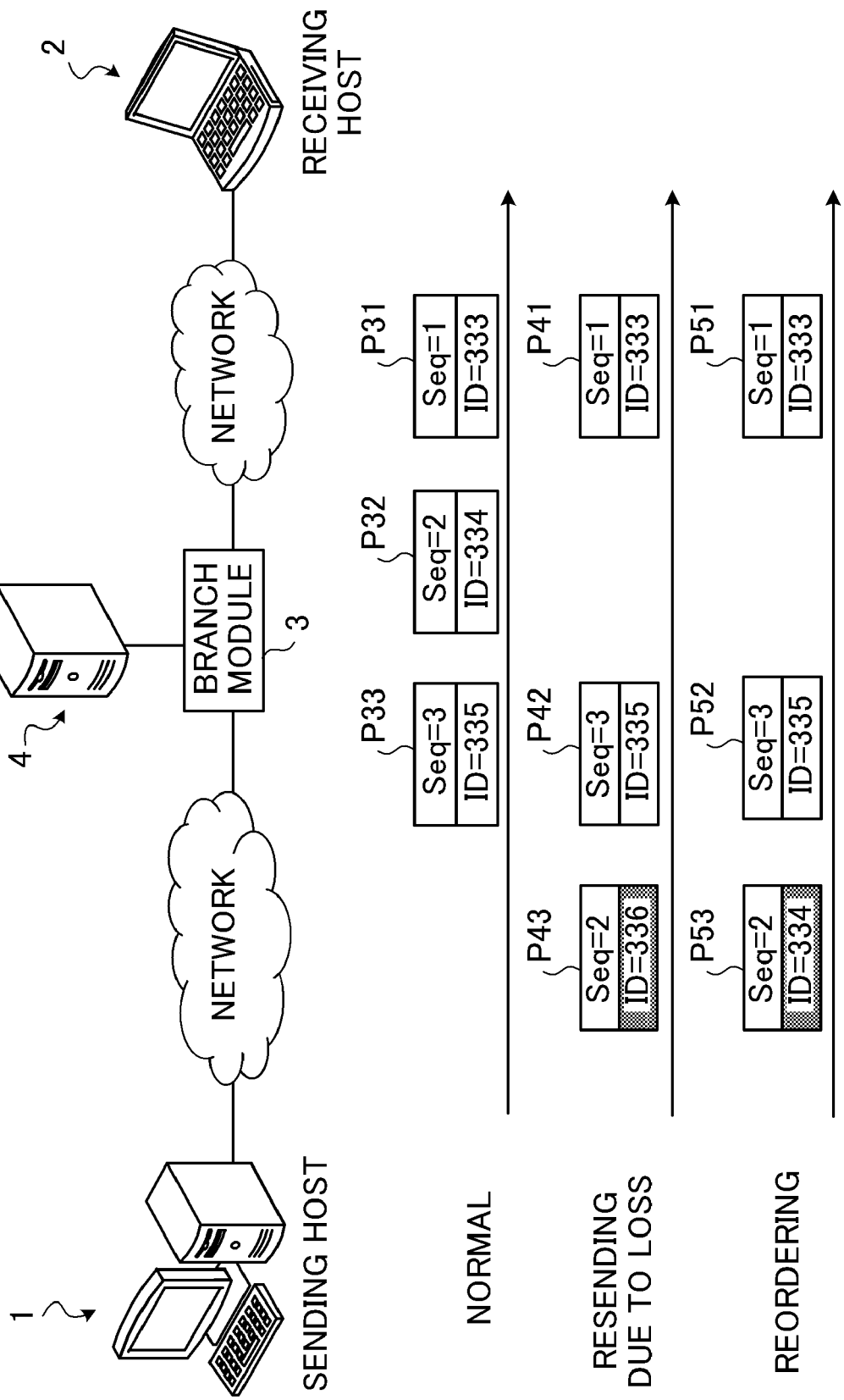
FIG. 8 is a diagram showing the outline of packet monitoring according to the second embodiment of the present invention.

FIG. 8 is a diagram showing the outline of packet monitoring according to the second embodiment of the present invention.

In FIG. 8, a packet monitoring apparatus 4 is connected to a network via a branch module 3, such as the monitoring port of a switch or a tap, on a communication path connecting a sending host 1 and a receiving host 2 and is adapted to be able to monitor packets sent from the sending host 1 to the receiving host 2.

Now, assume that packets P31, P32, and P33 in which the sets of a TCP sequence number Seq and an identifier ID [Seq, ID] respectively having the values [1, 333], [2, 334], and [3, 335] are sent from the sending host 1 toward the receiving host 2 in time series. In this case, by monitoring the sequence number Seq and the identifier ID for each packet, the packet monitoring apparatus 4 finds that there are no packet loss and reordering because the sequence number Seq and the identifier ID increase monotonously. In other words, the packet monitoring apparatus 4 can measure that the packets are correctly transferred on the network from the sending host 1 to the branch module 3, to which the packet monitoring apparatus 4 is connected, without packet loss and reordering.

Here, assume that packets P41, P42, and P43 in which the TCP sequence numbers Seq and the identifiers ID respectively having the values [1, 333], [3, 335], and [2, 336] are sent. The sequence number Seq changes from "1" to "3" in the packet P41 to the packet P42, so that one dropout occurs, and subsequently, the packet P43 having "2" arrives. Also, the identifier ID increases monotonously as "333," "335," and "336," so that it can be determined that reordering does not occur.

From the above, it can be determined that on the network from the sending host 1 to the branch module 3, the packet P43 in which the sequence number Seq is "2" disappears once due to loss, and to recover the loss, the packet P43 in which the sequence number Seq is "2" and the identifier ID is "336" is newly sent from the sending host 1.

Also, as a different case, assume that packets P51, P52, and P53 in which the TCP sequence numbers Seq and the identifiers ID respectively have the values [1, 333], [3, 335], and [2, 334] are sent. The sequence number Seq changes from "1" to "3" in the packet P51 to the packet P52, so that one dropout occurs, and subsequently, the packet P53 having "2" arrives. Here, the identifier ID does not increase monotonously, as "333," "335," and "334," so that it can be determined that reordering occurs for the packet P53 having "334" and the packet P52 having "335."

Figure 9:
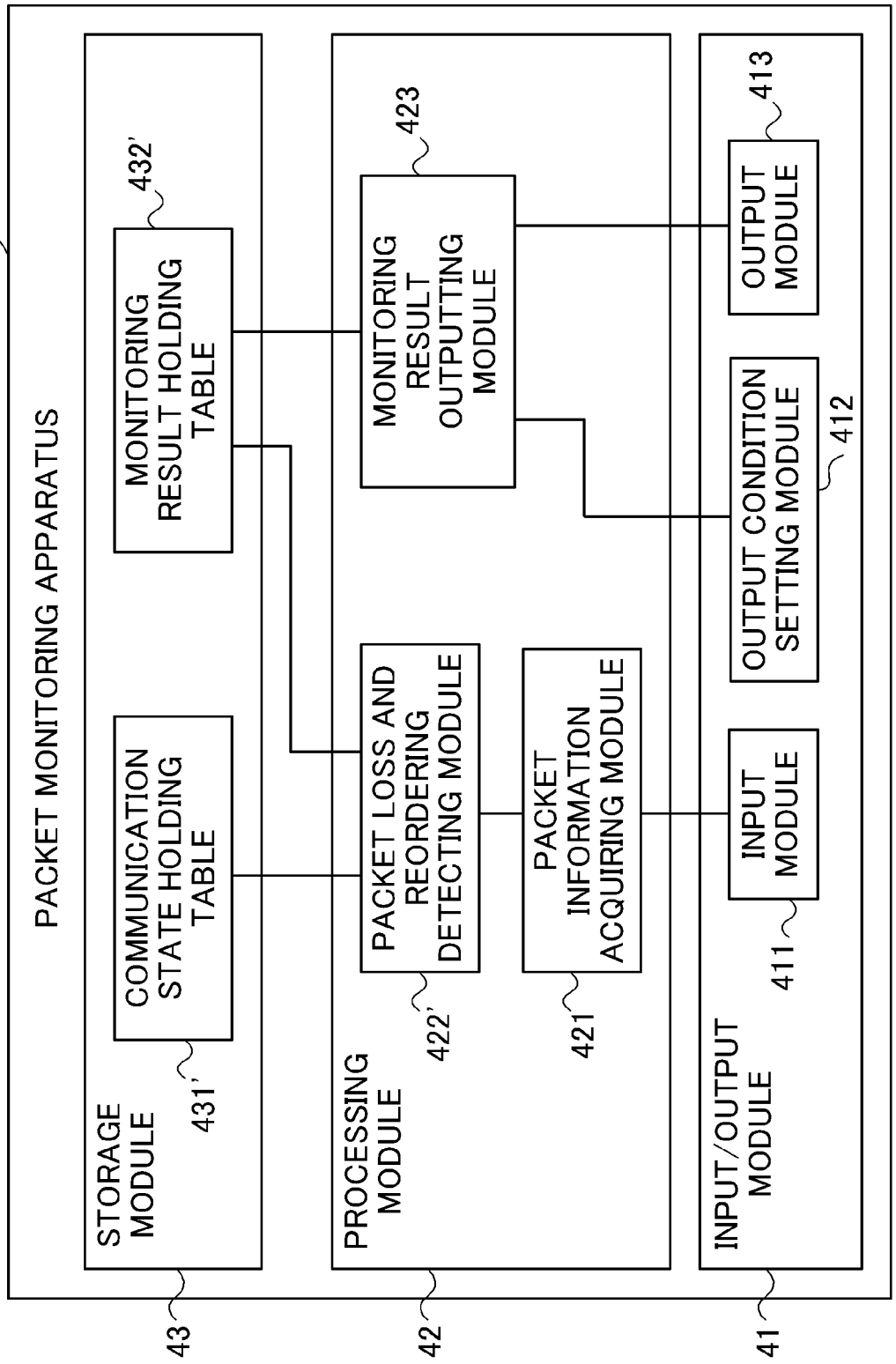
FIG. 9 is a diagram showing an example of the configuration of a packet monitoring apparatus.

FIG. 9 is a diagram showing an example of the configuration of the packet monitoring apparatus 4, which is similar to that of the first embodiment shown in FIG. 4 except that the reordering detecting module 422 is changed to a packet loss and reordering detecting module 422', that the communication state holding table 431 and the monitoring result holding table 432 are changed to a communication state holding table 431' and a monitoring result holding table 432', and that the data structure is changed.

The packet loss and reordering detecting module 422' has the function of determining a resending sequence according to a protocol above IP, such as TCP, and detecting packet loss, in addition to the function of detecting reordering that the reordering detecting module 422 in FIG. 4 has. The detailed processing of the packet loss and reordering detecting module 422' will be described later.

FIG. 10 is a diagram showing an example of the data structure of the communication state holding table 431', which has a "TCP session ID" field, a "source IP address" field, a "next Seq" field, a "lost sender Seq" field, and a "previous ID" field. The "TCP session ID" field is a field for holding a TCP session ID in which a source address SA and a destination address DA in an IP header, and a source port SP and a destination port DP in a TCP header are combined. The "source IP address" field is a field for holding a source address SA. The "next Seq" field is a field for holding a sequence number Seq expected to come next. The "lost sender Seq" field is a field for holding the sequence number Seq of a packet for which loss is confirmed. The "previous ID" field is a field for holding a previous identifier ID. The "lost sender Seq" field may hold a plurality of values.

FIG. 11 is a diagram showing an example of the data structure of the monitoring result holding table 432', which has a "TCP session ID" field for holding a TCP session ID, a "the number of packets" field, a "the number of losses" field, a "loss rate" field, a "the number of reordering" field, and an "reordering rate" field. The "the number of packets" field is a field for holding the number of packets for which sending with a corresponding TCP session ID is detected. The "the number of losses" field is a field for holding the number of losses detected among packets with the corresponding TCP session ID. The "loss rate" field is a field for holding a loss rate that is the ratio of the number of losses to the number of packets. The "the number of reordering" field is a field for holding the number of reordering detected among packets with the corresponding TCP session ID. The "reordering rate" field is a field for holding an reordering rate that is the ratio of the number of reordering to the number of packets.

Figure 12:
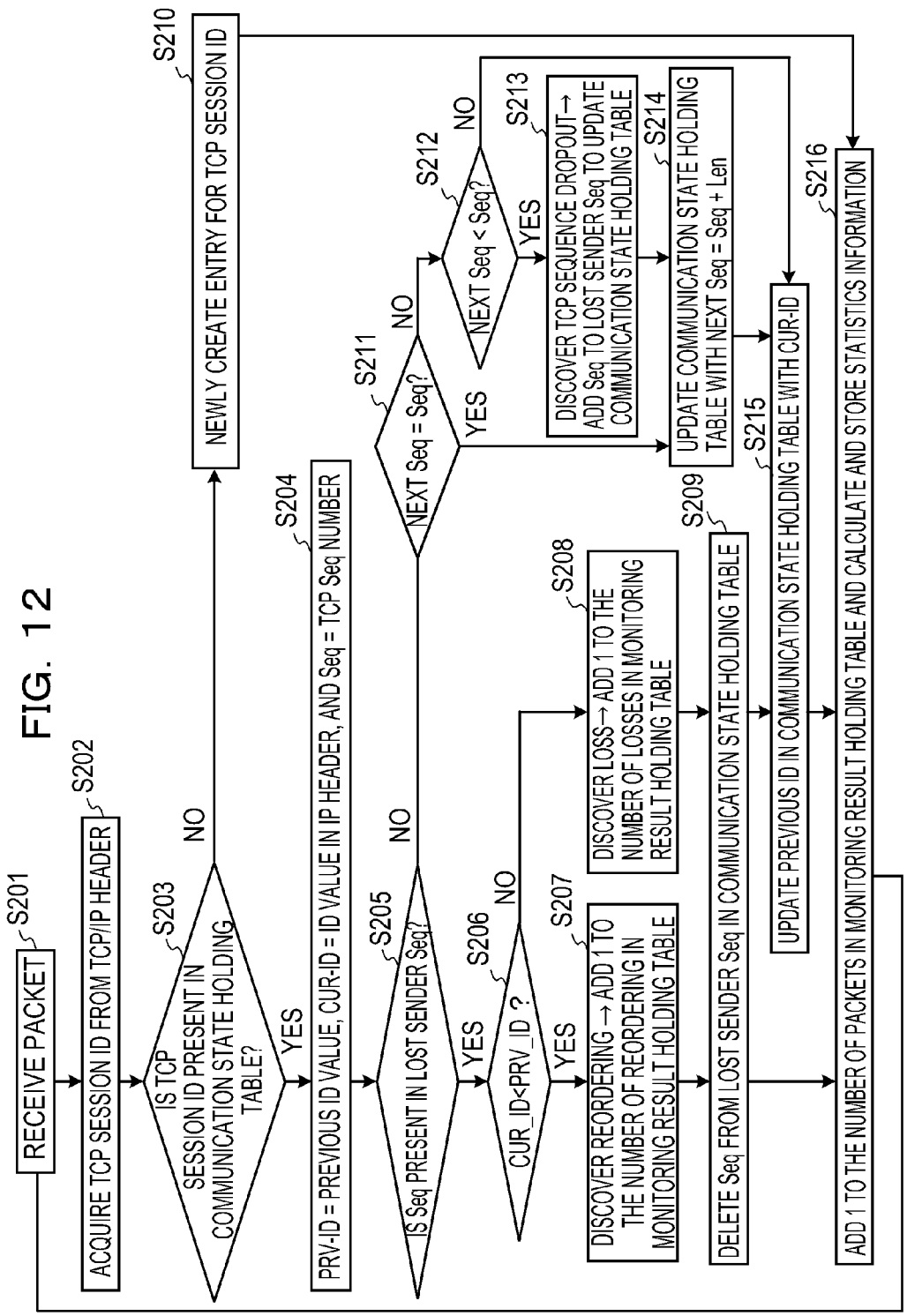
FIG. 12 is a flow chart showing an example of the processing of the second embodiment.

FIG. 12 is a flow chart showing an example of the processing of the second embodiment.

In FIG. 12, now, a case is considered where a packet having a TCP session ID="A," the source address SA "10.20.30.45," a sequence number Seq="676," and an identifier ID="334" arrives when data as in FIG. 10 is held in the communication state holding table 431'. Here, the TCP session ID is "A" for simplifying explanation, but in practice, the TCP session ID is a value expressed by a set of a source address SA, a destination address DA, a source port SP, and a destination port DP. Also, the sequence number Seq is in practice a 32-bit value for TCP, and also the identifier ID is a 16-bit value, so that they are often values larger than the values in this example.

When the above packet arrives (step S201), the TCP session ID="A" is acquired from the TCP/IP header (step S202).

Then, when the communication state holding table 431' is searched with the TCP session ID "A" as a key (step S203), the corresponding entry is present, and "335" is acquired as "the previous ID." This "335" is provisionally defined as PRV_ID, "334" acquired from the IP header is defined as CUR_ID, and "676" acquired from the TCP header is defined as Seq (step S204).

Then, when whether Seq is present in the lost sender Seq in the communication state holding table 431' is determined (step S205), "676" is present, so that then, CUR_ID and PRV_ID are compared to discriminate whether there is loss or reordering (step S206). The PRV_ID "335" is larger than the CUR_ID "334", so that it can be determined that there is reordering, and "3" is written as a value obtained by adding 1 to the number of reordering in the monitoring result holding table 432' (step S207). Then, "676" is deleted from the lost sender Seq in the communication state holding table 431' (step S209). Also, for the number of packets in the monitoring result holding table 432', "31" is written as a value obtained by adding 1, in addition, the loss rate and the reordering rate are also updated (step S216), and the process returns to receiving processing for the next packet (step S201).

On the other hand, supposing that a packet having a source address SA="10.20.30.45," a sequence number Seq="676," and an identifier ID="339" arrives (step S201) the PRV_ID "335" is smaller than the CUR_ID "339" (NO in step S206), so that it is determined that there is loss. Then, 1 is added to the number of losses in the monitoring result holding table 432' to be "1" (step S208), "676" is deleted from the lost sender Seq in the communication state holding table 431' (step S209), and the previous ID in the communication state holding table 431' is overwritten with "339" (step S215). Also, for the number of packets in the monitoring result holding table 432', "31" is written as a value obtained by adding 1, in addition, the loss rate and the reordering rate are also updated (step S216), and the process returns to receiving processing for the next packet (step S201).

On the other hand, when the TCP session ID is not present in the communication state holding table 431' (NO in step S203), an entry for the TCP session ID is newly created in the communication state holding table 431' (step S210). Then, 1 is added to the number of packets in the monitoring result holding table 432'. In addition, the loss rate and the reordering rate are also updated (step S216), and the process returns to receiving processing for the next packet (step S201).

On the other hand, when Seq is not present in the lost sender Seq in the communication state holding table 431' (NO in step S205), there is no loss or reordering, so that the communication state holding table 431' is updated as follows. Comparison is made as to whether the next Seq in the communication state holding table 431' and Seq are equal (step S211), and when they are not equal, further comparison is made as to whether Seq is larger than the next Seq (step S212). When Seq is larger (YES in step S212), it is considered that there is TCP sequence dropout, and Seq is added to the lost sender Seq in the communication state holding table 431' (step S213). When Seq is smaller (NO in step S212), there is no packet loss or reordering, so that the process proceeds to the update of the communication state holding table 431' (step S215). When the next Seq and Seq are equal (YES in step S211), it is considered that continuous data is normally received.

Subsequently, when the next Seq and Seq are equal (YES in step S211), the TCP data length Len is added to Seq to provide the next Seq (step S214). Then, the previous ID in the communication state holding table 431' is updated with CUR_ID (step S215), 1 is added to the number of packets in the monitoring result holding table 432', and the loss rate and the reordering rate are updated (step S216). Then, the process returns to receiving processing for the next packet (step S201).

According to the embodiments of the present invention, it is possible to accurately identify packet loss and reordering. The mechanisms of the occurrences of packet loss and reordering are totally different, so that if determination is wrong, failure cannot be restored, and much time is wasted until failure restoration. But packet loss and reordering can be accurately identified, so that failure causes can be accurately separated, and failure restoration time can be reduced.

Also, in analyzing the sequence of a protocol having a resending procedure in a layer above an IP layer, such as TCP, whether a packet is resent after packet loss, or reordering occurs in a network to change the arrival order can be accurately identified.

The present invention has been described according to the favorable embodiments of the present invention.

While the present invention has been described by way of specific examples here, it is apparent that various modifications and changes can be made to these specific examples without departing from the broad spirit and scope of the present invention defined in the claims. The detail of the specific examples and the accompanying drawings should not be construed as limiting the present invention.

What is claimed is:

1. A packet analysis method for analyzing content of communication obtained as a result of monitoring or capturing a packet passing through a network using a packet analysis apparatus connected to the network between a sending host and a receiving host, the packet analysis method comprising:
    a procedure of the packet analysis apparatus acquiring source or destination address information from a network layer packet header;
    a procedure of acquiring from the network layer packet header an identifier for which a value that increases monotonously with each sending for each source or destination address information is set;
    a procedure of searching for and acquiring the identifier in a previous packet having a source or destination address corresponding to source or destination address information in a current packet from a storage part of the packet analysis apparatus, wherein the previous packet is the packet received immediately prior to receiving the current packet; and
    a procedure of comparing the identifier in the previous packet acquired and the identifier in the current packet and determining that reordering occurs when the identifier in the current packet is smaller.

2. A packet analysis method for analyzing content of communication obtained as a result of monitoring or capturing a packet passing through a network using a packet analysis apparatus connected to the network between a sending host and a receiving host, the packet analysis method comprising:
    a procedure of the packet analysis apparatus acquiring session information from network layer and transport layer packet headers;
    a procedure of acquiring from the network layer packet header an identifier for which a value that increases monotonously with each sending for each source or destination address information is set;
    a procedure of acquiring sequence information from the transport layer packet header;
    a procedure of searching and acquiring the identifier in a previous packet having session information corresponding to session information in a current packet from a storage part of the packet analysis apparatus;
    a procedure of determining whether sequence information in the current packet is included in the storage part holding sequence information in a lost packet corresponding to session information;
    a procedure of comparing the identifier in the previous packet and the identifier in the current packet when the sequence information in the current packet is included in the lost packet in the storage part, and determining that reordering occurs when the identifier in the current packet is smaller; and a procedure of determining that packet loss occurs when the identifier in the current packet is larger.

3. The packet analysis method according to claim 1 or claim 2, wherein the comparison of the identifiers is performed inverting high order and low order according to arrangement of high-order bits and low-order bits.

4. The packet analysis method according to claim 1 or claim 2, wherein comparison of an identifier in a packet for which fixed communication time or more elapses is not performed.

5. The packet analysis method according to claim 1 or claim 2, wherein the comparison of the identifiers is performed considering circulation with a finite bit number.

6. A packet analysis apparatus for analyzing content of communication obtained as a result of monitoring or capturing a packet passing through a network, the packet analysis apparatus comprising:

a unit of acquiring source or destination address information from a network layer packet header;

a unit of acquiring from the network layer packet header an identifier for which a value that increases monotonously with each sending for each source or destination address information is set;

a unit of searching and acquiring the identifier in a previous packet having source or destination address information corresponding to source or destination address information in a current packet from a storage part, wherein the previous packet is the packet received immediately prior to receiving the current packet; and a unit of comparing the identifier in the previous packet acquired and the identifier in the current packet and determining that reordering occurs when the identifier in the current packet is smaller.

7. A packet analysis apparatus for analyzing content of communication obtained as a result of monitoring or capturing a packet passing through a network, the packet analysis apparatus comprising:

a unit of acquiring session information from network layer and transport layer packet headers;

a unit of acquiring from the network layer packet header an identifier for which a value that increases monotonously with each sending for each source or destination address information is set;

a unit of acquiring sequence information from the transport layer packet header;

a unit of searching and acquiring the identifier in a previous packet having session information corresponding to session information in a current packet from a storage part;

a unit of determining whether sequence information in the current packet is included in the storage part holding sequence information in a lost packet corresponding to session information;

a unit of comparing the identifier in the previous packet and the identifier in the current packet when the sequence information in the current packet is included in the lost packet in the storage part, and determining that reordering occurs when the identifier in the current packet is smaller; and a unit of determining that packet loss occurs when the identifier in the current packet is larger.

8. A non-transitory computer-readable medium storing a packet analysis program including instructions executed by a computer, the computer operating as a packet analysis apparatus for analyzing packets obtained as a result of monitoring or capturing a packet passing through a network, the program causing the computer to execute:

a procedure of acquiring source or destination address information from a network layer packet header;

a procedure of acquiring from the network layer packet header an identifier for which a value that increases monotonously with each sending for each source or destination address information is set;

a procedure of searching for and acquiring the identifier in a previous packet having source or destination address information corresponding to source or destination address information in a current packet from a storage part, wherein the previous packet is the packet received immediately prior to receiving the current packet; and a procedure of comparing the identifier in the previous packet acquired and the identifier in the current packet and determining that reordering occurs when the identifier in the current packet is smaller.

9. A non-transitory computer-readable recording medium storing a packet analysis program containing instructions upon executed on a computer, the computer being a packet analysis apparatus for analyzing content of communication obtained as a result of monitoring or capturing a packet passing through a network, the program causing the computer to execute:

a procedure of acquiring session information from network layer and transport layer packet headers;

a procedure of acquiring from the network layer packet header an identifier for which a value that increases monotonously with each sending for each source or destination address information is set;

a procedure of acquiring sequence information from the transport layer packet header;

a procedure of searching for and acquiring the identifier in a previous packet having session information corresponding to session information in a current packet from a storage part;

a procedure of determining whether sequence information in the current packet is included in the storage part holding sequence information in a lost packet corresponding to session information;

a procedure of comparing the identifier in the previous packet and the identifier in the current packet when the sequence information in the current packet is included in the lost packet in the storage part, and determining that reordering occurs when the identifier in the current packet is smaller; and a procedure of determining that packet loss occurs when the identifier in the current packet is larger.

* * * * *